US012780066B2

(12) United States Patent
Duddukunta et al.

(10) Patent No.: US 12,780,066 B2
(45) Date of Patent: Nov. 3, 2026

(54) ARMREST STRUCTURE OF VEHICLE

(71) Applicants: Hyundai Motor Company, Seoul (KR); Kia Corporation, Seoul (KR)

(72) Inventors: Surendra Reddy Duddukunta, Pendlimarri Mandal (IN); Karthik Hari Vamshi Uppalapati, Turkayamjal (IN); Chang Gyun Seo, Yongin-Si (KR); Jongseok Han, Suwon-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 211 days.

(21) Appl. No.: 18/405,851

(22) Filed: Jan. 5, 2024

(65) Prior Publication Data

US 2025/0153623 A1 May 15, 2025

(30) Foreign Application Priority Data

Nov. 15, 2023 (IN) ............................. 202311077636

(51) Int. Cl.
*B60N 2/75* (2018.01)

(52) U.S. Cl.
CPC ...................................... *B60N 2/79* (2018.02)

(58) Field of Classification Search
CPC .......... B60N 2/79; B60N 2/757; B60N 3/002; B60N 3/001
See application file for complete search history.

(56) References Cited

U.S. PATENT DOCUMENTS

| | | | | |
|---|---|---|---|---|
| 6,220,660 | B1 * | 4/2001 | Bedro | B60N 2/79 297/146 |
| 2010/0207441 | A1 * | 8/2010 | Senges | B60N 2/757 29/434 |
| 2014/0319867 | A1 * | 10/2014 | von Rothkirch und Panthen | B60N 3/002 296/1.09 |
| 2015/0203005 | A1 * | 7/2015 | Pendlebury | B60N 3/102 297/411.32 |
| 2018/0118069 | A1 * | 5/2018 | Miyazaki | B60N 2/75 |
| 2018/0178700 | A1 * | 6/2018 | Welch | B60N 3/102 |
| 2022/0105850 | A1 * | 4/2022 | Turletti | B60N 3/004 |
| 2024/0190321 | A1 * | 6/2024 | Salter | B60N 2/773 |
| 2024/0278701 | A1 * | 8/2024 | Stout, II | B60N 3/002 |

* cited by examiner

*Primary Examiner* — David R Dunn
*Assistant Examiner* — Tania Abraham
(74) *Attorney, Agent, or Firm* — MORGAN, LEWIS & BOCKIUS LLP

(57) ABSTRACT

An armrest structure provided to support an arm of a passenger and place articles inside a vehicle includes a support portion provided between backrest portions of a vehicle seat and provided to rotate in a height direction of the vehicle between the backrest portions and a seat portion of the vehicle by rotation, a base portion connected to one end portion of the support portion and provided to rotate in the height direction of the vehicle, and a desk portion slidably connected to the base portion to be moved and deployed to place articles on an upper surface of the desk portion.

20 Claims, 25 Drawing Sheets

ARMREST STRUCTURE OF VEHICLE

CROSS-REFERENCE TO RELATED APPLICATION

The present application claims priority to Indian Patent Application number 202311077636, filed on Nov. 15, 2023, the entire contents of which is incorporated herein for all purposes by this reference.

BACKGROUND OF THE PRESENT DISCLOSURE

Field of the Present Disclosure

The present disclosure relates to an armrest structure of a vehicle, and more particularly, to a foldable armrest structure capable of supporting the arm of a passenger and placing articles inside a vehicle.

Description of Related Art

For convenience of passengers, a device capable of placing articles may be provided in a rear seat inside a vehicle. In general, an article holder is installed at the rear of a front seat to place articles such as a laptop computer, and a passenger of the rear seat places articles or works.

However, because the front seat may be slid back and forth or an inclination of the front seat may be changed, the article holder is unstable, and thus, there is a problem in that articles placed on the article holder are not stably placed. Furthermore, due to a space occupied by the article holder, a space in which a passenger places his or her knees may be narrowed. On the other hand, when the article holder is provided on the front seat side, the visibility of a driver is reduced by the placed articles, which may cause driving inconvenience and accidents, and a position of the article holder overlaps with a position of an airbag, and thus, there is a problem in that the safety of the driver and passengers may not be guaranteed in the event of a collision.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a foldable armrest structure provided in a space between rear seat backrests inside a vehicle and configured for supporting the arm of a passenger and placing articles as needed.

According to various exemplary embodiments of the present disclosure, an armrest structure provided to support an arm of a passenger and place articles inside a vehicle includes a support portion provided between backrest portions of a vehicle seat and provided to rotate in a height direction of the vehicle between the backrest portions and a seat portion of the vehicle by rotation, a base portion connected to one end portion of the support portion and provided to rotate in the height direction of the vehicle, and a desk portion slidably connected to the base portion to be moved and deployed to place articles on an upper surface of the desk portion.

The support portion may include a support plate rotatably connected to the backrest portion of the vehicle seat, and a support frame supporting the support plate.

The support frame may include a rear support bracket rotatably connected to a vehicle body of the backrest portion of the vehicle seat, a front support bracket connected to the base portion, and a support tube connecting the rear support bracket to the front support bracket.

The base portion may be connected and rotated between the front support brackets of the support frame.

The base portion may be hingedly rotated in an inclined direction with respect to the support portion with respect to a hinge shaft.

Both end portions of the hinge shaft may be connected to the front support brackets of the support portion.

A bolt and a nut may be respectively provided at one end portion and the other end portion of the hinge shaft to prevent the hinge shaft from being separated from the front support brackets.

A metal plate may be provided on the base portion to be in contact with and supported by an external circumferential surface of the hinge shaft.

A groove may be formed in a surface of the base portion and extend in a longitudinal direction of the base portion, and the desk portion may be moved in an extension direction of the groove.

The groove may be formed in an asymmetrical shape and bent in a direction toward the vehicle seat on a side thereof.

The desk portion may include a first desk portion and a second desk portion connected side by side by connection pins and hingedly rotated with respect to each other.

A connection pin groove into which one end portion of the connection pin is inserted may be formed in the first desk portion corresponding to a portion where the connection pin is positioned.

The first desk portion may move along the groove.

A sliding pin may be provided to protrude from a lower surface of the first desk portion, and the sliding pin may be inserted into the groove.

The groove may be provided in a form in which the sliding pin is not separated in a direction perpendicular to the surface of the base portion while being inserted into the groove.

A pin stopper may be provided at an end portion of the groove to prevent the sliding pin from being separated from an end portion of the groove.

The pin stopper may be formed of an elastic member.

A desk portion stopper may be provided on the base portion to limit a range in which the desk portion moves toward the support portion, and a counter stopper in contact with and supported by the desk portion stopper when colliding with the desk portion stopper may be provided on the first desk portion.

An electric charging port for charging electronic products may be provided in the support portion.

The support portion, the base portion, and the desk portion each may be provided in a pair of symmetrical shapes arranged side by side on the backrest portion of the vehicle seat.

According to the armrest structure according to various exemplary embodiments of the present disclosure, it is possible to support the arm of a passenger accommodated in the rear seat inside the vehicle and place articles, and thus, convenience of the passenger may be improved.

Furthermore, it is possible to secure the space of a knee portion of the passenger even when the armrest is deployed to place articles, and thus, space utilization is excellent.

Furthermore, cost and weight may be reduced by a simple and optimized structure which is accommodated or deployed between the rear seat backrests.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1A:
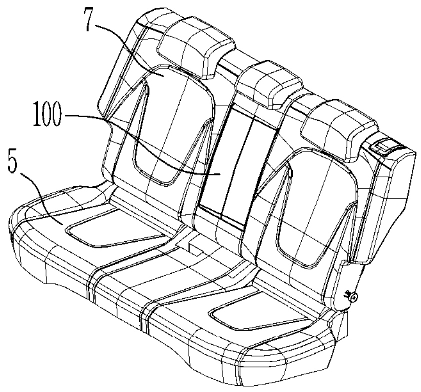
FIG. 1A, FIG. 1B, and FIG. 1C are views showing a change state of an armrest structure according to various exemplary embodiments of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, with reference to the accompanying drawings, various exemplary embodiments of the present disclosure will be described in detail so that those skilled in the art may easily embody the present disclosure. The present disclosure may be embodied in many different forms and is not limited to the exemplary embodiments set forth herein.

Furthermore, in various exemplary embodiments of the present disclosure, components having the same configuration are typically described in an exemplary embodiment using the same reference numerals, and in the other embodiments, only configurations different from an exemplary embodiment will be described.

It is advised that the drawings are schematic and not drawn to scale. Relative dimensions and proportions of parts in the drawings are shown exaggerated or reduced in size for clarity and convenience in the drawings, and arbitrary dimensions are illustrative only and not limiting. Furthermore, the same reference numerals are used to indicate similar features in the same structure, element or parts appearing in two or more drawings. When a part is referred to as being "above" or "on" another part, it may be directly above the other part or may have other parts intervening therebetween.

Various exemplary embodiments of the present disclosure specifically represents various exemplary embodiments of the present disclosure. As a result, various variations of the diagram are expected. Therefore, the exemplary embodiment of the present disclosure is not limited to a specific form of an illustrated area, and includes, for example, modification of the form by manufacturing.

Hereinafter, an armrest structure of a vehicle according to various exemplary embodiments of the present disclosure will be described in detail with reference to the accompanying drawings.

Figure 1B:
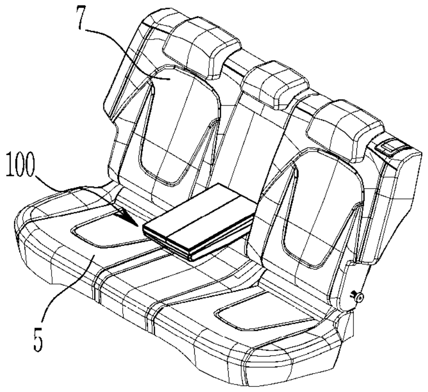
Figure 1C:
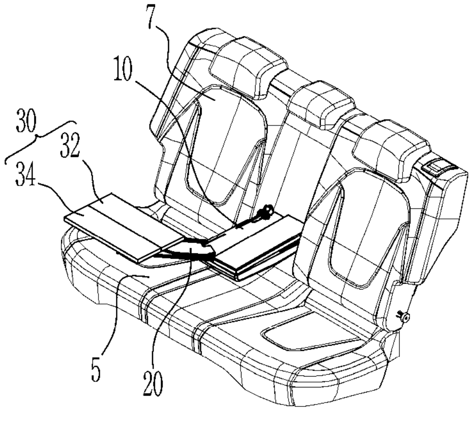

FIG. 1A, FIG. 1B, and FIG. 1C are views showing a change state of an armrest structure according to various exemplary embodiments of the present disclosure.

Referring to FIG. 1A, FIG. 1B, and FIG. 1C, an armrest structure 100 according to various exemplary embodiments of the present disclosure is provided to support an arm of a passenger and place articles inside a vehicle, and includes a support portion 10, a base portion 20, and a desk portion 30.

The support portion 10 is provided between backrest portions 7 of a vehicle seat, and when the armrest structure 100 is accommodated in the space between the backrest portions 7 of the vehicle seat, is a part where its bottom surface is visible from the outside thereof. When the armrest structure 100 is deployed in the space between the backrest portions 7, the bottom surface of the support portion 10 is positioned to face a floor of the vehicle. That is, the support portion 10 may be provided to rotate up and down in a height direction of the vehicle between the backrest portion 7 and a seat portion 5.

The base portion 20 may be connected to one end portion of the support portion 10 and may be rotated in the height direction of the vehicle, and the desk portion 30 is connected to the base portion 20 to be slidingly moved, and is deployed so that articles may be placed on an upper surface of the desk portion 30.

As shown in FIG. 1A, when the armrest structure 100 is not used, the support portion 10, the base portion 20, and the desk portion 30 are accommodated in the space between the backrest portions 7 of both vehicle seats in an overlapped state.

Furthermore, as shown in FIG. 1B, when the armrest structure 100 is used to support the arm of the passenger, the support portion 10 hingedly rotates toward the seat portion 5 of the vehicle, and is disposed in a direction substantially parallel to the seat portion 5 of the vehicle. The passenger may support the arm on the base portion 20.

Furthermore, as shown in FIG. 1C, when the armrest structure 100 is used to place articles, the base portion 20 is rotated forward in the height direction of the vehicle with respect to one end portion of the support portion 10, the desk portion 30 is slidingly moved on the base portion 20, and then the desk portion 30 is deployed. Articles may be placed on the deployed desk portion 30.

The armrest structure 100 including the support portion 10, the base portion 20, and the desk portion 30 may be provided as a pair of symmetrical shapes provided side by side to the backrest portion 7 of the vehicle seat so that the armrest structure 100 may be used on both sides of the seat portion 5 of the vehicle.

Figure 2:
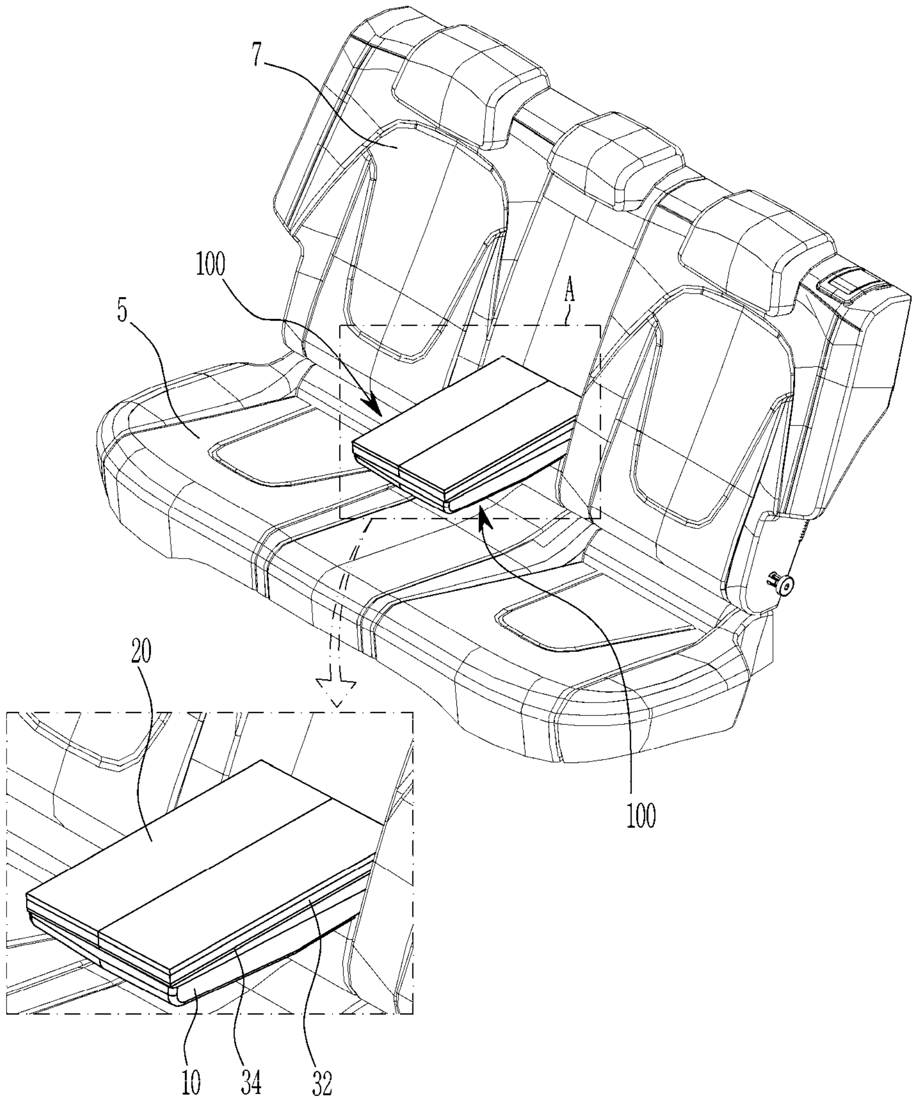
FIG. 2 is a view showing a state after rotation of a support portion of the armrest structure according to various exemplary embodiments of the present disclosure.

FIG. 2 is a view showing a state after rotation of a support portion of the armrest structure according to various exemplary embodiments of the present disclosure.

Referring to FIG. 2, when the armrest structure 100 is used to support the arm of a passenger, the support portion 10, the base portion 20, and the desk portion 30 hingedly rotate toward the seat portion 5 of the vehicle and is disposed in a direction substantially parallel to the seat portion 5. At the instant time, from the side of the seat portion 5, the support portion 10, the desk portion 30, and the base portion 20 are in a sequentially stacked state. The armrest structure 100 provided as a pair of left and right symmetrical shapes may hingedly rotate, respectively, if necessary.

Figure 3A:
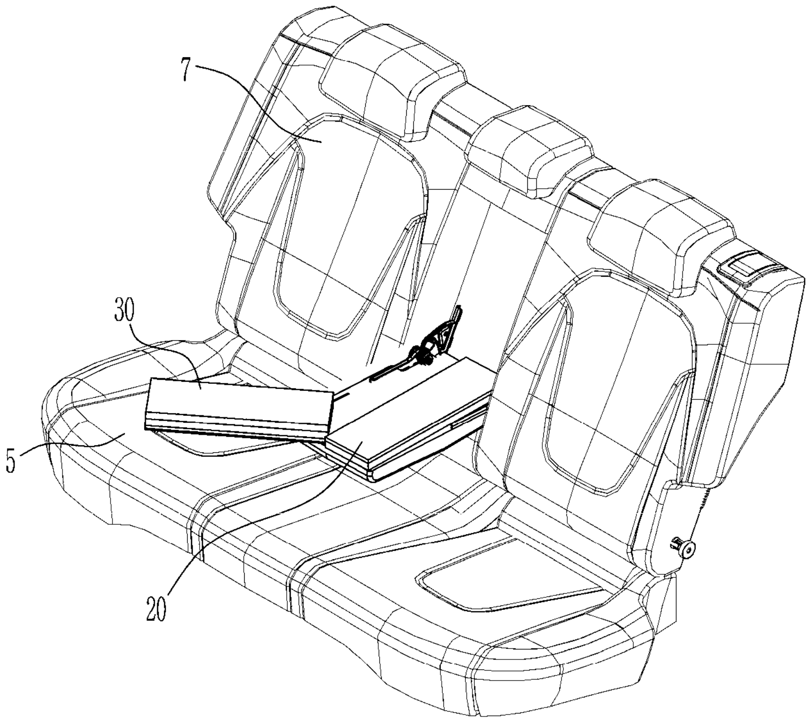
FIG. 3A and FIG. 3B are views showing a state after rotation of a base portion of the armrest structure according to various exemplary embodiments of the present disclosure.
Figure 3B:
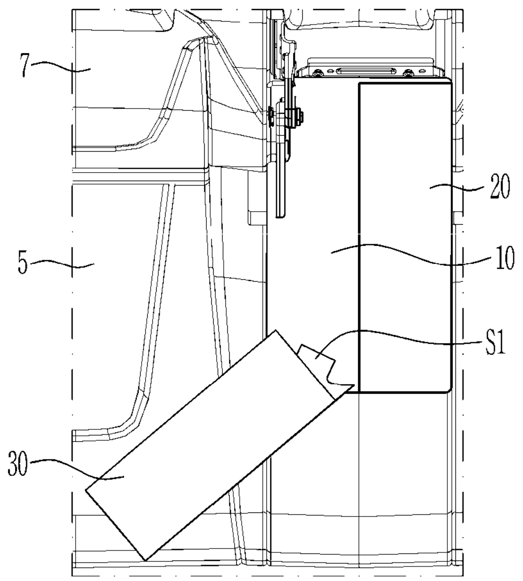

FIG. 3A and FIG. 3B are views showing a state after rotation of a base portion of the armrest structure according to various exemplary embodiments of the present disclosure.

Referring to FIG. 3A, when the armrest structure 100 is used to place articles, first, in a state in which the support portion 10 is positioned in a direction substantially parallel to the seat portion 5, the base portion 20 and the desk portion 30 rotate and are deployed from the support portion 10.

Each of the armrest structures 100 provided as a pair in a left and right symmetrical form may be used in a state where the base portion 20 does not rotate to support the arm, or may be used by rotating the base portion 20 to place articles, if necessary.

At the present time, as shown in FIG. 3B, one end portion of the base portion 20 is rotatably connected to one end portion of the support portion 10 with respect to a rotation shaft S1, and the base portion 20 is rotated forward along with the desk portion 30 in a height direction of a vehicle. At the instant time, the base portion 20 may be hingedly rotated in an inclined direction with respect to the support portion 10 with respect to a hinge shaft 24, that is, toward the seat portion 5. After rotation, the base portion 20 is in a state facing a surface of the seat portion 5.

Figure 4A:
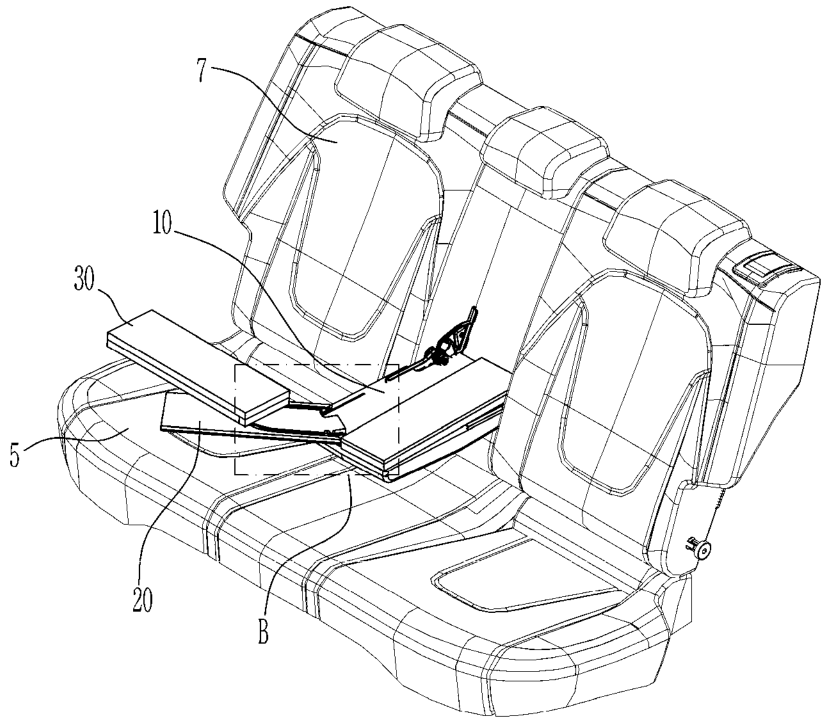
FIG. 4A and FIG. 4B are views showing a state after a desk portion of the armrest structure slidingly moves on the base portion according to various exemplary embodiments of the present disclosure.
Figure 4B:
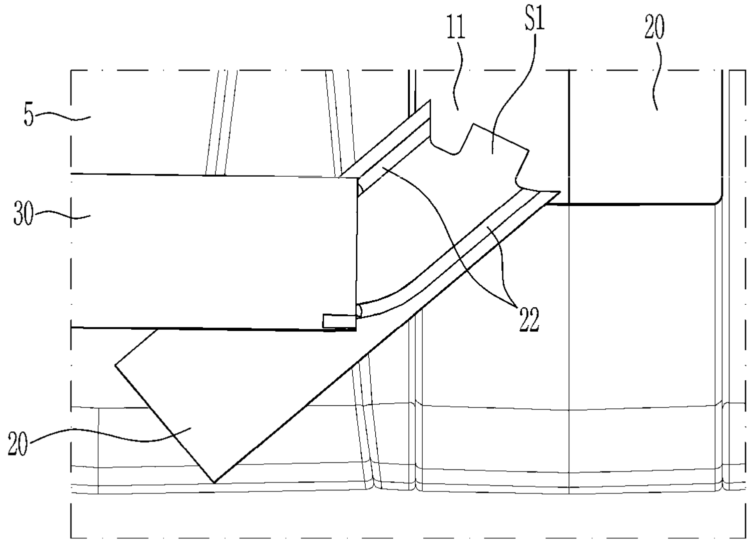

FIG. 4A and FIG. 4B are views showing a state after a desk portion of the armrest structure slidingly moves on the base portion according to various exemplary embodiments of the present disclosure.

Referring to FIG. 4A, when the armrest structure 100 is used to place articles, the desk portion 30 rotates and is separated from the support portion 10, and then the desk portion 30 slidingly moves on the base portion 20.

As shown in FIG. 4B, grooves 22 are formed in a surface of the base portion 20 and extends in a longitudinal direction of the base portion 20, and the desk portion 30 may move in an extension direction of the groove 22. The grooves 22 may be provided in a pair formed in an asymmetrical shape, and one groove 22 may be in a shape bent in a direction toward a vehicle seat of one side. When the desk portion 30 completes a sliding movement on the base portion 20, the desk portion 30 may be positioned in an extending form in a direction substantially parallel to the backrest portion 7.

Figure 5A:
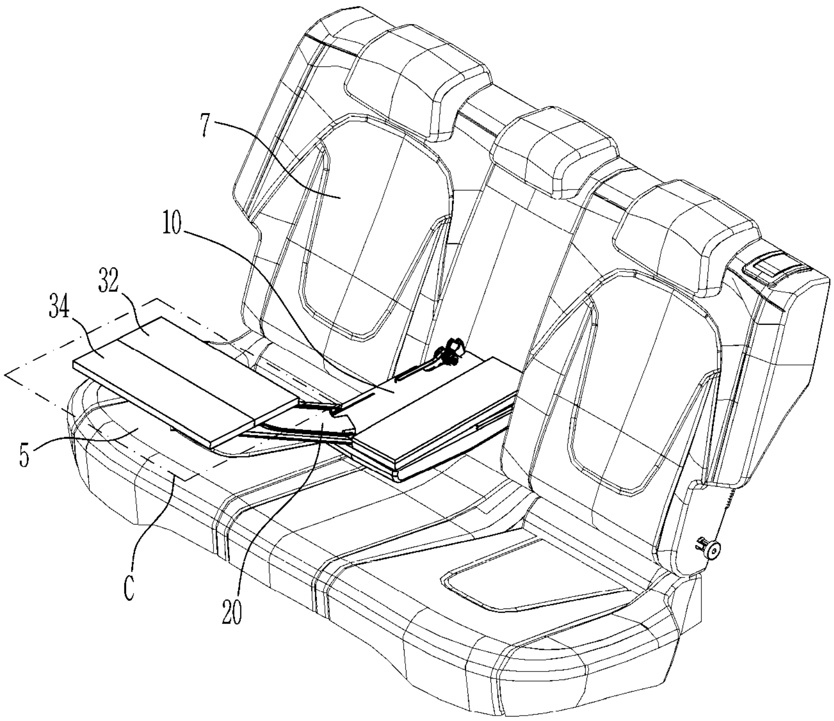
FIG. 5A and FIG. 5B are views showing a state in which the desk portion of the armrest structure hingedly rotates and is deployed according to various exemplary embodiments of the present disclosure.
Figure 5B:
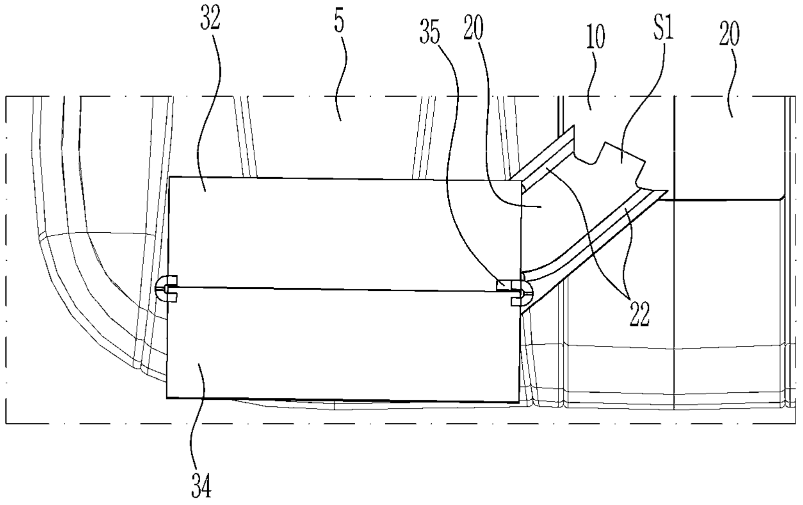

FIG. 5A and FIG. 5B are views showing a state in which the desk portion of the armrest structure hingedly rotates and is deployed according to various exemplary embodiments of the present disclosure.

Referring to FIG. 5A, when the armrest structure 100 is used to place articles, the desk portion 30 slidingly moves on the base portion 20 and then the desk portion 30 expands. That is, the desk portion 30 may include a first desk portion 32 and a second desk portion 34 that are connected side by side by connection pins 35 and hingedly rotate with respect to each other.

As shown in FIG. 5B, the first desk portion 32 may contact with a surface of the base portion 20 and move along the grooves 22 formed in the base portion 20. After the desk portion 30 completes a sliding movement on the base portion 20, the second desk portion 34 hingedly rotates toward the front of a vehicle with respect to the first desk portion 32, so that the first desk portion 32 and the second desk portion 34 expand while forming the same plane. Articles may be placed on the expanded desk portion 30, and a passenger may use the articles while sitting on the vehicle seat.

Figure 6:
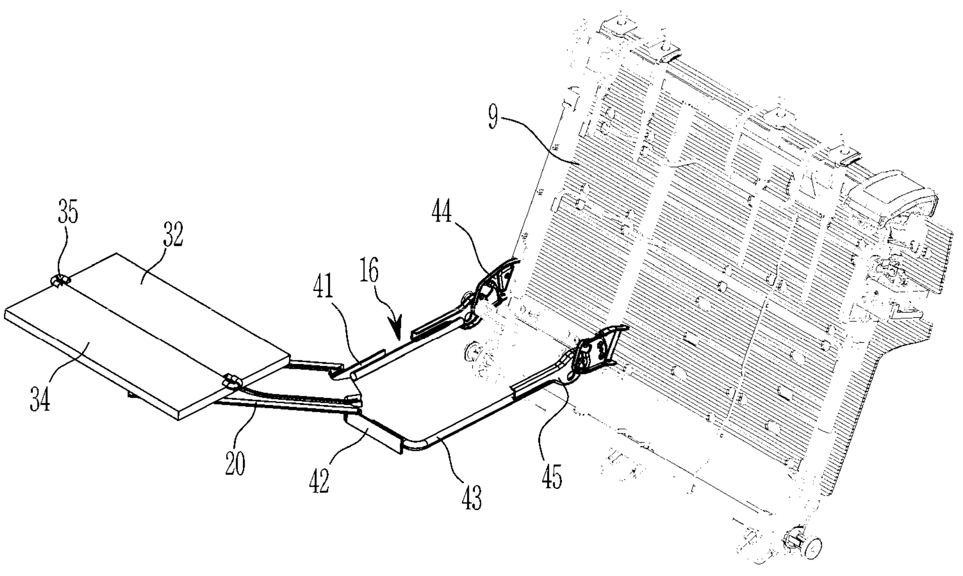
FIG. 6 is a view showing a state in which the base portion and the desk portion are connected to a support frame of the armrest structure according to various exemplary embodiments of the present disclosure.

FIG. 6 is a view showing a state in which the base portion and the desk portion are connected to a support frame of the armrest structure according to various exemplary embodiments of the present disclosure.

Referring to FIG. 6, the support portion 10 may include a support plate 11 rotatably connected to the backrest portion 7 of a vehicle seat, and a support frame 16 supporting the support plate 11. One end portion of the support frame 16 is rotatably connected to a seat vehicle body 9 on a rear side of the backrest portion 7 of the vehicle seat, and the other end portion thereof is rotatably connected to the base portion 20. Therefore, when the armrest structure 100 is used, while one end portion of the support frame 16 rotates toward the front of a vehicle with respect to the seat vehicle body 9, the support portion 10, the base portion 20, and the desk portion 30 may also be rotated together.

Figure 7:
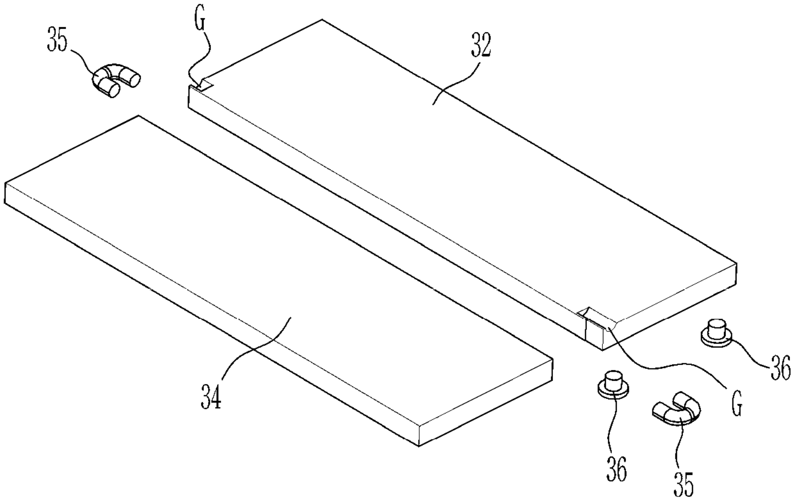
FIG. 7 is an exploded perspective view showing the desk portion of the armrest structure according to various exemplary embodiments of the present disclosure.

FIG. 7 is an exploded perspective view showing the desk portion of the armrest structure according to various exemplary embodiments of the present disclosure.

Referring to FIG. 7, the first desk portion 32 and the second desk portion 34 are connected side by side by the connection pins 35, and the connection pins 35 are provided at end portions of the first desk portion 32 and the second desk portion 34, respectively. Connection pin grooves G into which one end portions of the connection pins 35 are respectively inserted may be formed in parts where the connection pins 35 are positioned. When the desk portion 30 expands, the second desk portion 34 is hingedly rotated with respect to the first desk portion 32 with respect to the connection pins 35.

Figure 8:
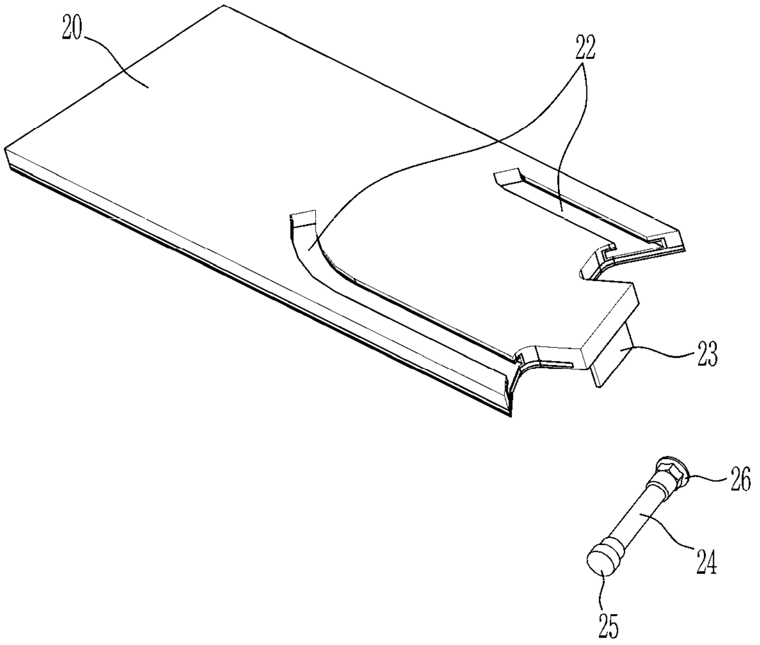
FIG. 8 is a view showing the base portion of the armrest structure according to various exemplary embodiments of the present disclosure.

FIG. 8 is a view showing the base portion of the armrest structure according to various exemplary embodiments of the present disclosure.

Referring to FIG. 8, the grooves 22 formed in a surface of the base portion 20 may be formed in a pair formed in an asymmetrical shape, and one groove 22 may be a shape bent in a direction toward one side of a vehicle seat. Due to the shape of the groove 22, the desk portion 30 slidingly moving on the base portion 20 may be rotated in a horizontal direction thereof.

A metal plate 23 may be provided at an end portion of the base portion 20 to be in contact with and supported by an external circumferential surface of the hinge shaft 24. When the base portion 20 rotates with respect to the hinge shaft 24 with respect to the support portion 10, the metal plate 23 may contact with a lower surface of the support portion 10 and fix the base portion 20 while being rotated. The metal plate 23 may protrude and be formed in a direction perpendicular to a surface of the base portion 20 and may have sufficient rigidity so that the base portion 20 is fixed while being rotated.

Figure 9:
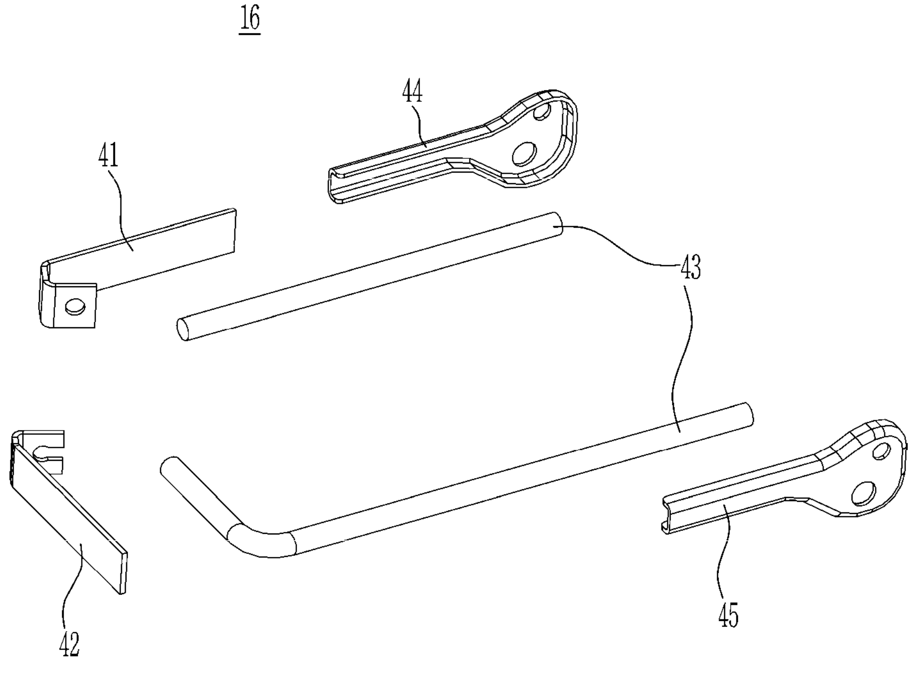
FIG. 9 is an exploded perspective view showing the support frame of the armrest structure according to various exemplary embodiments of the present disclosure.
Figure 10A:
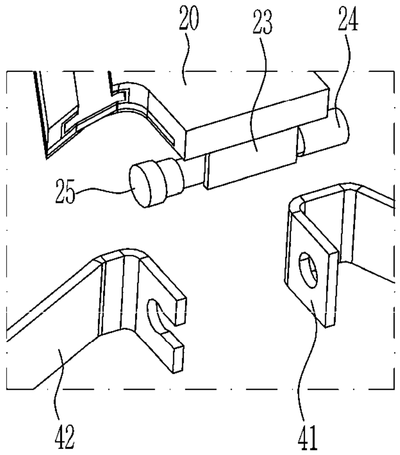
FIG. 10A, FIG. 10B, FIG. 10C and FIG. 10D are views showing in detail a state of the base portion connected to the support frame of the armrest structure according to various exemplary embodiments of the present disclosure.
Figure 10B:
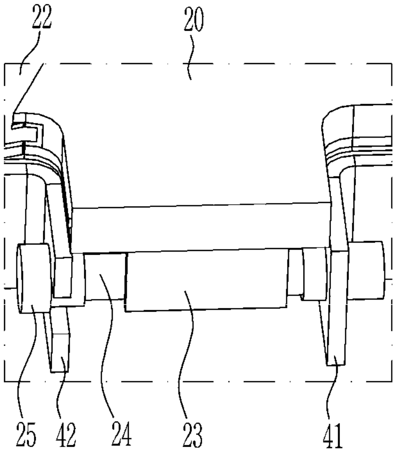
Figure 10C:
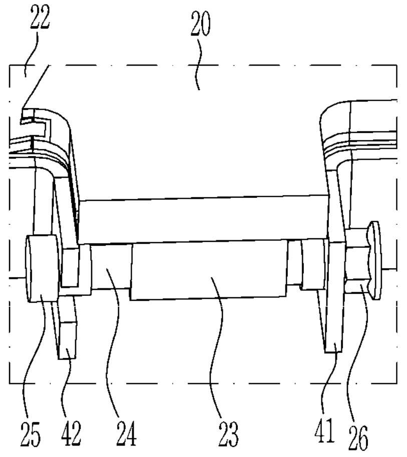
Figure 10D:
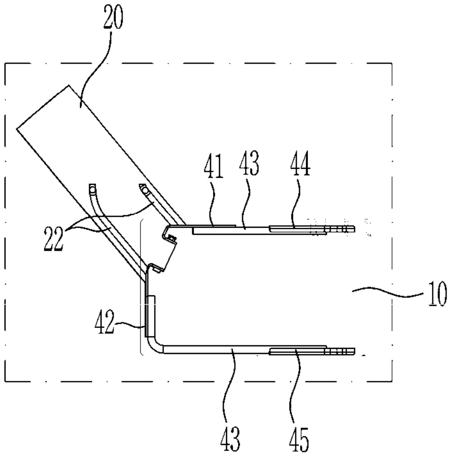
Figure 11A:
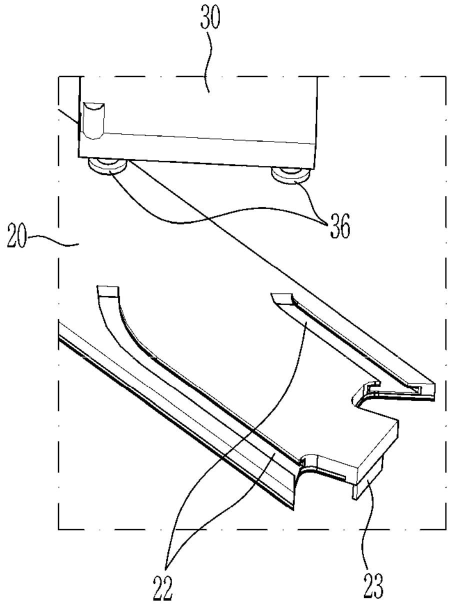
FIG. 11A, FIG. 11B, FIG. 11C and FIG. 11D are views showing in detail a state of the desk portion connected to the base portion of the armrest structure according to various exemplary embodiments of the present disclosure.
Figure 11B:
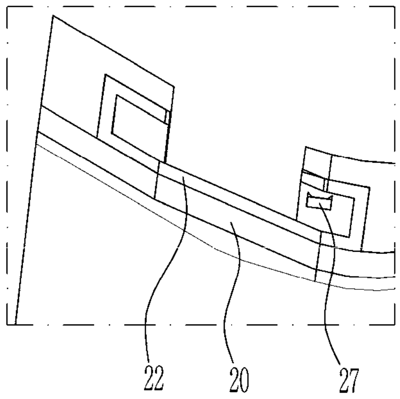
Figure 11C:
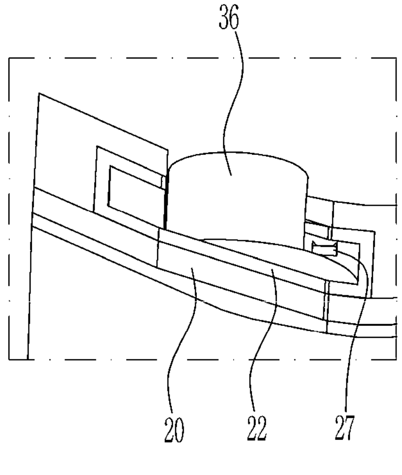
Figure 11D:
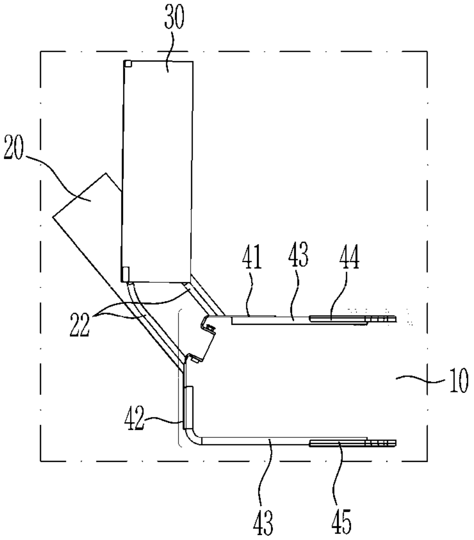

FIG. 9 is an exploded perspective view showing the support frame of the armrest structure according to various exemplary embodiments of the present disclosure.

Referring to FIG. 9, the support frame 16 may include rear support brackets 44 and 45 rotatably connected to a vehicle body of the backrest portion 7 of a vehicle seat, front support brackets 41 and 42 connected to the base portion 20, and a support tube 43 respectively connecting the rear support brackets 44 and 45 to the front support brackets 41 and 42.

The base portion 20 may be connected between the front support brackets 41 and 42 of the support frame 16 and rotated. The rear support brackets 44 and 45, the front support brackets 41 and 42, and the support tube 43 each may be provided in a pair, and the front support brackets 41 and 42 and the support tube 43 may be formed in an asymmetrical shape. The base portion 20 connected to the front support brackets 41 and 42 in the asymmetrical shape may be hingedly rotated in an inclined direction with respect to the support portion 10. Both end portions of the hinge shaft 24 may be connected to the front support brackets 41 and 42 of the support portion 10

FIG. 10A, FIG. 10B, FIG. 10C and FIG. 10D are views showing in detail a state of the base portion connected to the support frame of the armrest structure according to various exemplary embodiments of the present disclosure.

Referring to FIG. 10A, FIG. 10B, FIG. 10C, and FIG. 10D, the metal plate 23 may be provided in the base portion 20 to be in contact with and supported by an external circumferential surface of the hinge shaft 24. The hinge shaft 24 may be connected to the front support brackets 41 and 42 of the support portion 10, a bolt 25 and a nut 26 are respectively provided at one end portion and the other end portion of the hinge shaft 24 to prevent the hinge shaft 24 from being separated from the front support brackets 41 and 42, and the hinge shaft 24 may be rotatably coupled to the front support brackets 41 and 42 by the bolt 25 and the nut 26.

FIG. 11A, FIG. 11B, FIG. 11C and FIG. 11D are views showing in detail a state of the desk portion connected to the base portion of the armrest structure according to various exemplary embodiments of the present disclosure.

Referring to FIG. 11A, FIG. 11B, FIG. 11C, and FIG. 11D, the grooves 22 may be formed in a surface of the base portion 20 and extend in the longitudinal direction of the base portion 20, and the desk portion 30 may move in an extension direction of the grooves 22. To the present end, sliding pins 36 may be provided to protrude from a lower surface of the first desk portion 32, and the sliding pins 36 may be inserted into the grooves 22.

The grooves 22 may be formed to surround the sliding pins 36. That is, the grooves 22 may be provided in a form in which the sliding pins 36 are inserted into the grooves 22 and are not separated in a direction perpendicular to the surface of the base portion 20.

Meanwhile, a pin stopper 27 may be provided at end portions of the grooves 22 to prevent the sliding pins 36 from being separated from the end portions of the grooves 22. The pin stopper 27 may be formed of an elastic member such as a spring or rubber material. The pin stopper 27 may be provided in any one of a pair of grooves 22, or may be provided in both.

Figure 12:
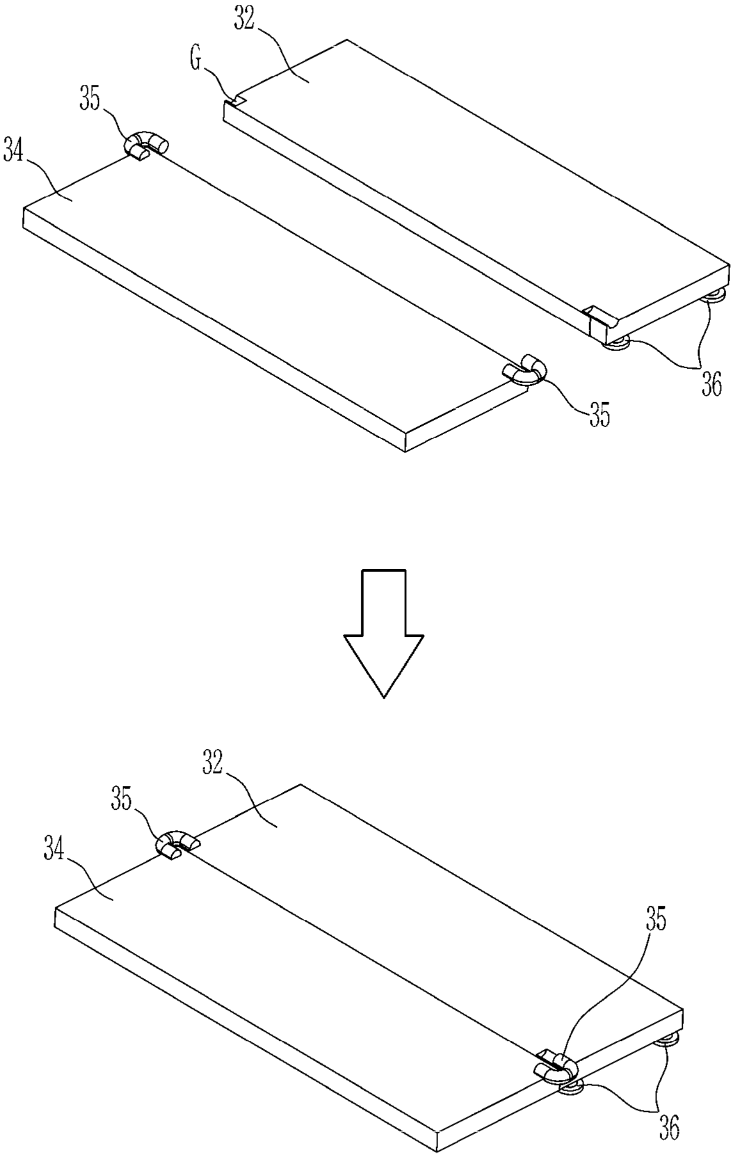
FIG. 12 is a diagram showing a connection state of the desk portion of the armrest structure according to various exemplary embodiments of the present disclosure.

FIG. 12 is a diagram showing a connection state of the desk portion of the armrest structure according to various exemplary embodiments of the present disclosure.

As shown in FIG. 12, the connection pin 35 may be provided at an end portion of the second desk portion 34, and the connection pin groove G into which one end portion of the connection pin 35 is inserted may be formed in the first desk portion 32 corresponding to a part where the connection pin 35 is positioned. One side of the connection pin 35 may be fixed to an upper surface of the second desk portion 34, and the other side may be inserted into the connection pin groove G. The connection pin 35 and the connection pin groove G may include a rounded shape to facilitate rotation.

The sliding pin 36 may be provided to protrude from a surface opposite to a surface of the first desk portion 32 in which the connection pin groove G is formed, and the sliding pin 36 may be inserted into the groove 22 formed in the base portion 20.

Figure 13:
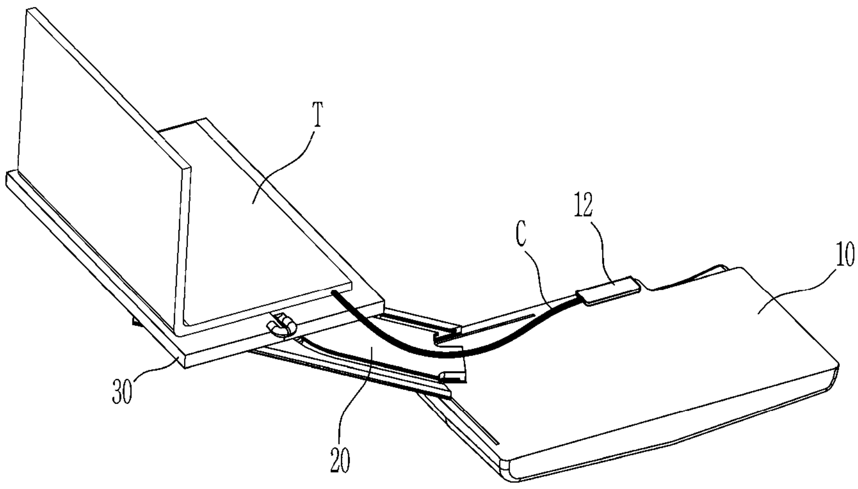
FIG. 13 is a view showing a state of an electric charging port provided in the support portion of the armrest structure according to various exemplary embodiments of the present disclosure.

FIG. 13 is a view showing a state of an electric charging port provided in the support portion of the armrest structure according to various exemplary embodiments of the present disclosure.

As shown in FIG. 13, the electric charging port 12 for charging electronic products may be provided in the support portion 10. For example, a passenger may place articles such as a tablet computer T on the desk portion 30, and use the electric charging port 12 by connecting a cable C to the electric charging port 12 provided in the support portion 10 for charging the tablet computer.

Figure 14:
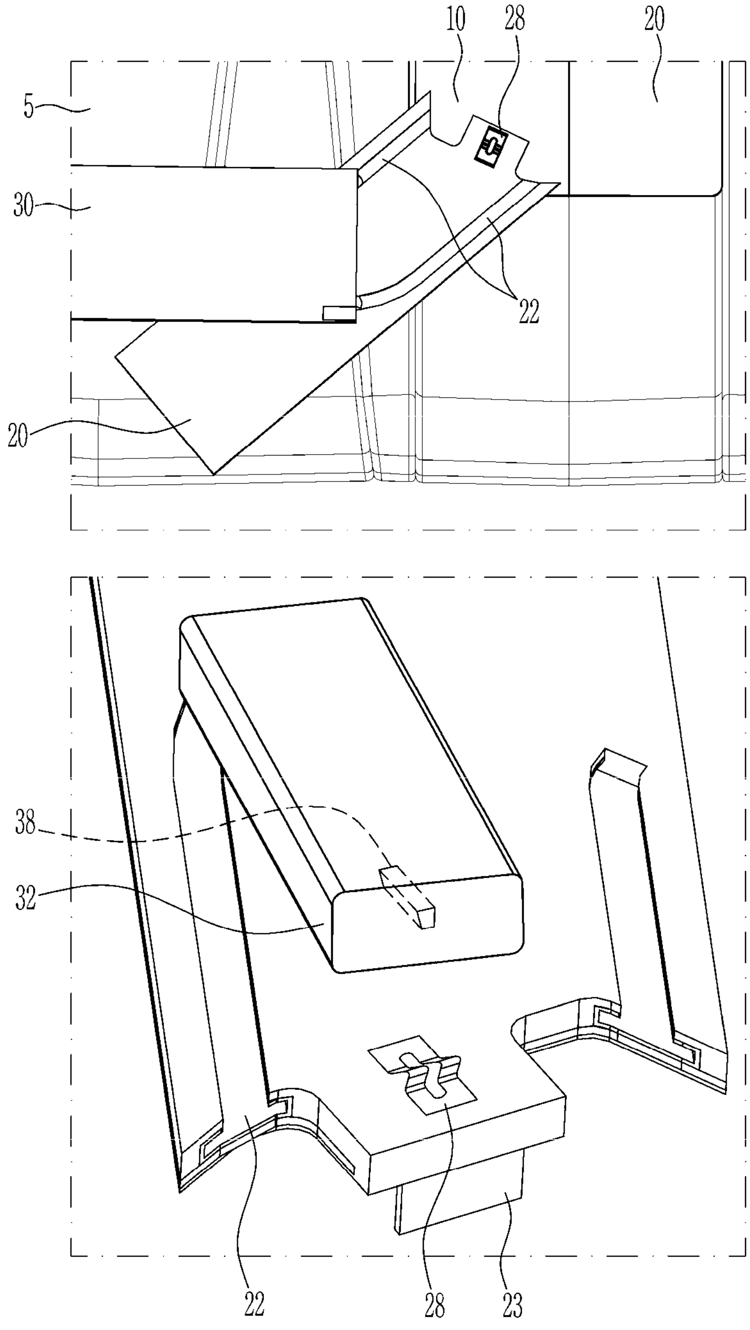
FIG. 14 is a diagram illustrating a connection relationship between a desk portion stopper and a counter stopper of the armrest structure according to various exemplary embodiments of the present disclosure.

FIG. 14 is a diagram illustrating a connection relationship between a desk portion stopper and a counter stopper of the armrest structure according to various exemplary embodiments of the present disclosure.

Referring to FIG. 14, a desk portion stopper 28 may be provided in the base portion 20 to limit a range in which the desk portion 30 moves toward the support portion 10. The desk portion stopper 28 may be provided on a surface of the base portion 20 in which the grooves 22 are formed, and may be positioned between the grooves 22. Furthermore, a counter stopper 38 in contact with and supported by the desk portion stopper 28 when colliding with the desk portion stopper 28 may be proved in the first desk portion 32.

When the desk portion 30 moves toward the support portion 10 on the base portion 20, the desk portion stopper 28 is in contact with the counter stopper 38, and a movement of the desk portion 30 may be stopped. The desk portion stopper 28 and the counter stopper 38 may be formed of an elastic member so that impact upon contact may be alleviated.

As described above, according to the armrest structure according to various exemplary embodiments of the present disclosure, it is possible to support the arm of a passenger accommodated in the rear seat inside the vehicle and place articles, and thus, convenience of the passenger may be improved.

Furthermore, it is possible to secure the space of a knee portion of the passenger even when the armrest is deployed to place articles, and thus, space utilization is excellent.

Furthermore, cost and weight may be reduced by a simple and optimized structure which is accommodated or deployed between the rear seat backrests.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An armrest structure provided to support an arm of a passenger and place articles inside a vehicle, the armrest structure comprising:
- a support portion disposed between backrest portions of a vehicle seat and provided to rotate in a height direction of the vehicle between the backrest portions and a seat portion of the vehicle by rotation;
- a base portion rotatably connected to one end portion of the support portion to selectively rotate in the height direction of the vehicle and slidably connected to the support portion to be selectively movable forward from the support portion; and
- a desk portion slidably coupled to at least one groove of the base portion and movable along the at least one groove to be deployed to place articles on an upper surface of the desk portion.

2. The armrest structure of claim 1, wherein the support portion includes:
- a support plate rotatably connected to the backrest portions of the vehicle seat; and
- a support frame supporting the support plate.

3. The armrest structure of claim 2, wherein the support frame includes:
- rear support brackets rotatably connected to a vehicle body of the backrest portions of the vehicle seat;
- front support brackets connected to the base portion; and
- a support tube connecting the rear support brackets to the front support brackets.

4. The armrest structure of claim 3, wherein one end of the base portion is connected and rotated between the front support brackets of the support frame.

5. The armrest structure of claim 4, wherein the base portion is hingedly rotated in an inclined direction with respect to the support portion with respect to a hinge shaft.

6. The armrest structure of claim 5, wherein first and second end portions of the hinge shaft are connected to the front support brackets of the support portion.

7. The armrest structure of claim 6, wherein a bolt and a nut are respectively provided at the first end portion and the second end portion of the hinge shaft to prevent the hinge shaft from being separated from the front support brackets.

8. The armrest structure of claim 5, wherein a metal plate is provided on the base portion to be in contact with and supported by an external circumferential surface of the hinge shaft.

9. The armrest structure of claim 1,
- wherein the at least one groove is formed in a surface of the base portion and extends in a longitudinal direction of the base portion, and
- wherein the desk portion is slidably engaged to the at least one groove and moved in an extension direction of the at least one groove.

10. The armrest structure of claim 9, wherein the at least one groove is formed in an asymmetrical shape and bent in a direction toward the vehicle seat on a side thereof.

11. The armrest structure of claim 9, wherein the desk portion includes a first desk portion and a second desk portion connected side by side by a connection pin and hingedly rotated with respect to each other.

12. The armrest structure of claim 11, wherein a connection pin groove into which one end portion of the connection pin is inserted is formed in the first desk portion corresponding to a part where the connection pin is positioned.

13. The armrest structure of claim 11, wherein the first desk portion is engaged to the at least one groove and moves along the at least one groove.

14. The armrest structure of claim 13, wherein at least one sliding pin is provided to protrude from a lower surface of the first desk portion, and the at least one sliding pin is inserted into the at least one groove.

15. The armrest structure of claim 14, wherein the at least one groove is provided in a form in which the at least one sliding pin is not separated in a direction perpendicular to the surface of the base portion while being inserted into the at least one groove.

16. The armrest structure of claim 14, wherein a pin stopper is provided at an end portion of the at least one groove to prevent the at least one sliding pin from being separated from an end portion of the at least one groove.

17. The armrest structure of claim 16, wherein the pin stopper is formed of an elastic member.

18. The armrest structure of claim 11, wherein a desk portion stopper is provided on the base portion to limit a range in which the desk portion moves toward the support portion, and wherein a counter stopper in contact with and supported by the desk portion stopper in colliding with the desk portion stopper is provided on the first desk portion.

19. The armrest structure of claim 1, wherein an electric charging port for charging electronic products is provided in the support portion.

20. The armrest structure of claim 1, wherein the support portion, the base portion, and the desk portion each are provided in a pair of symmetrical shapes provided side by side on the backrest portions of the vehicle seat.

* * * * *